United States Patent
Kalam

(10) Patent No.: US 12,113,874 B2
(45) Date of Patent: Oct. 8, 2024

(54) INTERNET DATA USAGE OPTIMIZATION USING COMPUTER VISION

(71) Applicant: DISH NETWORK TECHNOLOGIES INDIA PRIVATE LIMITED, Karnataka (IN)

(72) Inventor: Arun Pulasseri Kalam, Bangalore (IN)

(73) Assignee: DISH Network Technologies India Private Limited, Bangalore (IN)

( * ) Notice: Subject to any disclaimer, the term of this patent is extended or adjusted under 35 U.S.C. 154(b) by 153 days.

(21) Appl. No.: 17/686,667

(22) Filed: Mar. 4, 2022

(65) Prior Publication Data

US 2023/0283683 A1 Sep. 7, 2023

(51) Int. Cl.
- *A61B 5/1455* (2006.01)
- *G06F 3/01* (2006.01)
- *H04L 47/80* (2022.01)
- *H04L 67/50* (2022.01)

(52) U.S. Cl.
CPC ............ *H04L 67/535* (2022.05); *H04L 47/80* (2013.01)

(58) Field of Classification Search
None
See application file for complete search history.

(56) References Cited

U.S. PATENT DOCUMENTS

| | | | |
|---|---|---|---|
| 9,665,169 B1* | 5/2017 | Dai | A61B 5/6898 |
| 10,334,346 B2* | 6/2019 | Boesen | H04R 1/1016 |
| 10,762,928 B1* | 9/2020 | Camus | H04N 21/42201 |
| 2010/0107184 A1* | 4/2010 | Shintani | H04N 21/42201 725/10 |
| 2016/0080448 A1* | 3/2016 | Spears | H04N 21/44213 709/219 |
| 2016/0255422 A1* | 9/2016 | Matsuno | A61B 5/681 340/870.39 |
| 2016/0311440 A1 | 10/2016 | Gan | |
| 2019/0327124 A1* | 10/2019 | Lai | G01S 5/017 |

* cited by examiner

Primary Examiner — Clayton R Williams
Assistant Examiner — Ho T Shiu
(74) Attorney, Agent, or Firm — Seed IP Law Group LLP

(57) ABSTRACT

A system and method for controlling consumption of data, the system including a data consumption device, an acquisition device and a back-end server. Information relating to a user is acquired, and an assessment whether the user is in a predetermined physical state is made. In response to assessing that the user is in the predetermined physical state, a signal is transmitted to reduce the data consumed by the data consuming device.

20 Claims, 8 Drawing Sheets

INTERNET DATA USAGE OPTIMIZATION USING COMPUTER VISION

BACKGROUND

The internet is a global system of interconnected computers and computer networks that use a standard internet protocol suite to communicate with each other. With the continued expansion of internet, data and bandwidth have become of the utmost importance for consumers and internet service providers. In some situations, such as in rural regions, internet is more difficult for service providers to provide and can be prohibitively expensive for some consumers.

Internet service providers attempting to add internet infrastructure to provide internet in rural areas may also be faced with high expenses, and may pass these costs to consumers. In some cases, in rural areas but also in other areas, only certain types of internet service, for example satellite internet service, is common. In such cases, internet service providers may enforce data caps or charge additional amounts once a particular allotment of data is used. Data may be also charged based upon the amount used. Thus, data must be used cautiously by consumers to avoid prohibitive expenses and temporary shutdown of internet service.

Despite these restrictions on data, users, including those in rural areas, often rely on the internet for many critical and noncritical needs. In some instances, users may require an internet connection to view live or recorded television, using an over-the-top (OTT) media service. Such OTT services, while useful and important to users around the world, require significant amounts of internet data consumption.

Accordingly, there is a need for systems and methods that may allow for a user's data usage to be more efficiently controlled, for example by assessing when the user is consuming data using an OTT service but is not actively watching a program.

SUMMARY

Various embodiments described herein generally provide apparatuses, systems and methods to control and manage internet data usage by a consumer, particularly by determining whether a device consuming the data should be disconnected due to an assessed state of a user.

According to one embodiment, a method for controlling data consumed by a data consuming device is provided. The method includes checking whether the data consuming device is consuming data via a connection to a network. Further, in a case where it is determined that the data consuming device is consuming data via the connection to the network, the method further includes acquiring information about at least one physical attribute of a user, assessing whether the user is in a predetermined physical state using the acquired data about the at least one physical attribute, and transmitting a signal to reduce the data consumed by the data consuming device in response to assessing that the user is in the predetermined physical state.

According to one embodiment, a system for controlling data consumption is provided. The system includes a back-end server connected to a network in which an acquisition device and a data consuming device are also connected. The back-end server provides data to the data consuming device via the network. The back-end server includes a processor that is configured to receive, via the network, information about at least one physical attribute of a user, the at least one physical attribute acquired by the acquisition device. The processor is further configured to assess the received information about the at least one physical attribute of the user and determine whether the user is in a predetermined physical state. The processor is further configured to transmit a signal, via the network, to reduce data consumed by the data consuming device in response to determining that the user is in the predetermined physical state.

According to one embodiment, a system for controlling data consumption is provided. The system includes an acquisition device, a data consuming device including a processor, and a back-end server. The acquisition device includes a processor programmed to acquire data about at least one physical attribute of a user and transmit the acquired data to at least one of the back-end server and the data consuming device. The back-end server includes a processor configured to assess the acquired data and determine whether the user is in a predetermined physical state and, when the user is in the predetermined physical state, transmit a signal to reduce the data consumed by the data consuming device.

DETAILED DESCRIPTION OF EMBODIMENTS

Figure 1:
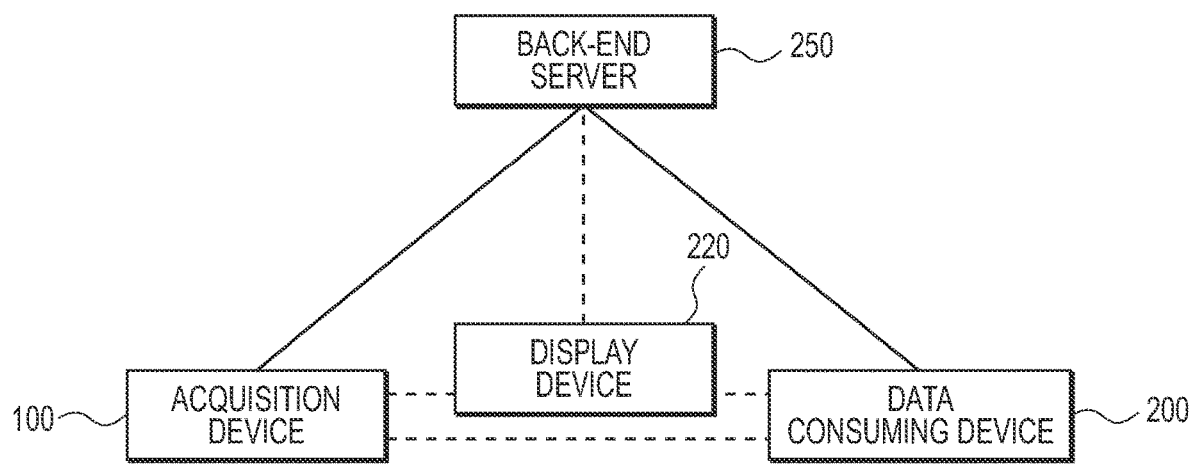
FIG. 1 shows a block diagram of a system for controlling data consumption according to one or more embodiments.

The various embodiments described herein generally provide apparatuses, systems and methods to manage and/or control data usage of a data consuming device.

Internet to a particular location may be supplied by any source, such as an over-the-air or cellular network, a satellite or cable internet distribution system, or other communication networks. This internet feed may be received by a gateway device, such as a router, at the location, such as a person's home. The gateway device then provides internet access to various devices, such as streaming devices and the like, in the home. Additionally or alternatively, data and/or access to the internet may be provided in a manner that do not require a separate gateway device, for example with a cellular phone directly connected to the cellular network Given the continually increasing need for internet, due in part to the increasing number of internet-connected devices that a user uses on a constant basis and due also to the increased amount of data that such devices are capable of consuming, a need for controlling data usage is necessary, particularly in regions where internet infrastructure is scarce or it is otherwise difficult to provide data to users.

Internet service providers may deal with the infrastructure and/or data transmission problems by charging users in some areas a significant rate per byte or megabyte or gigabyte of usage, or charging progressively higher fees as data usage increases, or even by capping an amount of data a user may use in a particular time period, for example per month or per year. However, users still want to utilize internet data for critical needs and to maximize their enjoyment, for example by watching streamed media. Accordingly, systems and methods for efficiently managing data usage are desirable.

Such systems and methods can be done in multiple different ways, which are described herein according to various embodiments. In one embodiment, an acquisition device will be used to acquire data relating to a user, such as data of at least one attribute of a user and will transmit such data to a back-end server. The acquisition device and/or the back-end server may utilize the data to determine whether the user is in a particular predetermined state, such as a sleeping state, in which case the acquisition device and/or the back-end server will communicate with the data consuming device to take an action to reduce its data consumption. In such an example, the user's internet data usage will be limited or otherwise reallocated in a case where the user has fallen asleep and is unable to enjoy the content that is being provided to him or her.

The following definitions are provided in order to aid those skilled in the art in understanding the detailed description.

The term "data consuming device," as used herein, refers to a hardware device that has a capability of consuming data or connecting with a device that consumes data. The data may be internet data and may include data consumed by media, such as media data. Such devices may include, but are not limited to, devices capable of accessing streaming content on a network such the internet, a local network, or any network, and/or devices that can display media from an OTT service or other content-providing service. Such devices may include, for example, a television, a computer (desktop, laptop, or any type of computer), a tablet, and a cellular telephone. Such devices may also include a Roku®, Amazoni® Fire TV® stick, Chromecast®, or other media device that allows for streaming using an OTT service.

The term "acquisition device" may be any device capable of acquiring information that relates to a user. The information relating to a user may be at least one attribute, such as a physical attribute, of a user. These may include images of a user, biometrics of a user, or any other physical attributes. Exemplary acquisition devices may include a camera that may be capable of imaging the user, a LIDAR that may detect a positioning of the user, or a wearable device that may determine biometric data relating to the user.

FIG. 1 shows an example of a network that includes an acquisition device 100, a data consuming device 200, a display device 220, and a back-end server 250. The network may utilize any desired combination of wired (e.g., cable and fiber) and/or wireless (e.g., cellular, satellite, microwave, and radio frequency) communication mediums and any desired network topology (or topologies when multiple mediums are utilized). In the instant embodiments, the data consuming device 200 and the display device 220 are represented as a smart (internet-enabled) television, but the devices are not so limited and may be different/separate devices.

The acquisition device 100 may include a hardware processor such as a central processing unit (CPU) that is configured to execute instructions stored in a storage medium provided therein. The data consuming device 200 may also include its own internal hardware processor such as a central processing unit (CPU) that is configured to execute instructions stored in a storage medium provided therein. In embodiments where the acquisition device and data consuming device are the same device, the processor of the acquisition device and the processor of the data consuming device may be subcomponents of a single hardware processor that can function as each individual processor.

The data consuming device 200 may be independent from or integrated with the display device 220. For example, the data consuming device 200 maybe a television when the television is a smart television, as in such a case the television will directly connect to a network such as the internet using internal hardware (and by communicating with a gateway device), and would act as both the display device 220 and the data consuming device 200.

The data consuming device 200 may also be a peripheral device capable of connecting with the display device 220 by wired or wireless connection. The data consuming device 200 may connect to the internet by wired or wireless connection, for example by communicating with the gateway device.

The DVR 210 may also include its own internal hardware processor such as a central processing unit (CPU) that is configured to execute instructions stored in a storage medium provided therein. In some instances, the DVR 210 may act as the data consuming device 200, or may have a data consuming device 200 integrated therewith.

The back-end server 250 may be a server that is external to the acquisition device 100, data consuming device 200 and DVR 210, but it also may be internal to one or more of such components. In either situation, the back-end server 250 also includes both a hardware processor such as a central processing unit (CPU) and a storage medium such as a memory, and the hardware processor of the back-end server 250 is configured to execute instructions stored in a storage medium provided therein. In embodiments where any combination of the acquisition device 100, data consuming device 200 and back-end server 250 are within the same physical device (e.g., within a smart TV or a cellular telephone or a DVR), the processor of the acquisition device, any or all of the processor of the data consuming device and the processor of the back-end server may be subcomponents of a single hardware processor that can function as each individual processor.

In some embodiments, the back-end server 250 and its memory is capable of storing information about a plurality of users. The back-end server 250 may belong to the OTT provider or another party, or may be owned and managed by the user. The back-end server 250 may store information allowing the back-end server 250 to recognize which of a plurality of users is utilizing a particular internet data allotment, and may include other preferences and/or data relating to such a user. As an example, the back-end server 250 may store personal data about user 400, including his or her data allotment, cost for data, home address, the router number of his or her gateway device, which devices have been connected to the internet, his or her data usage, and so on. This may be stored within a database having similar information for various other users within the memory of the back-end server 250.

As discussed in more detail later, the back-end server 250 is also capable of storing information about a user's assessed state, so as to better learn when to transmit the signal to reduce data consumption of the user's data consuming device 200, further, the back-end server 250 may communicate with the data consuming device 200 to provide the content, such as OTT media and/or streaming content, to be displayed on the display device 220. That is, the back-end server 250 may serve as any combination of an OTT media provider such as internet streaming service provider, and may also be a back-end analyzer of data acquired by the acquisition device 100. Further, the back-end server may belong to the OTT media provider and be housed at a location owned by the OTT media provider, or some other location remote from the rest of the system but communicating with the rest of the system via the network.

Figure 2A:
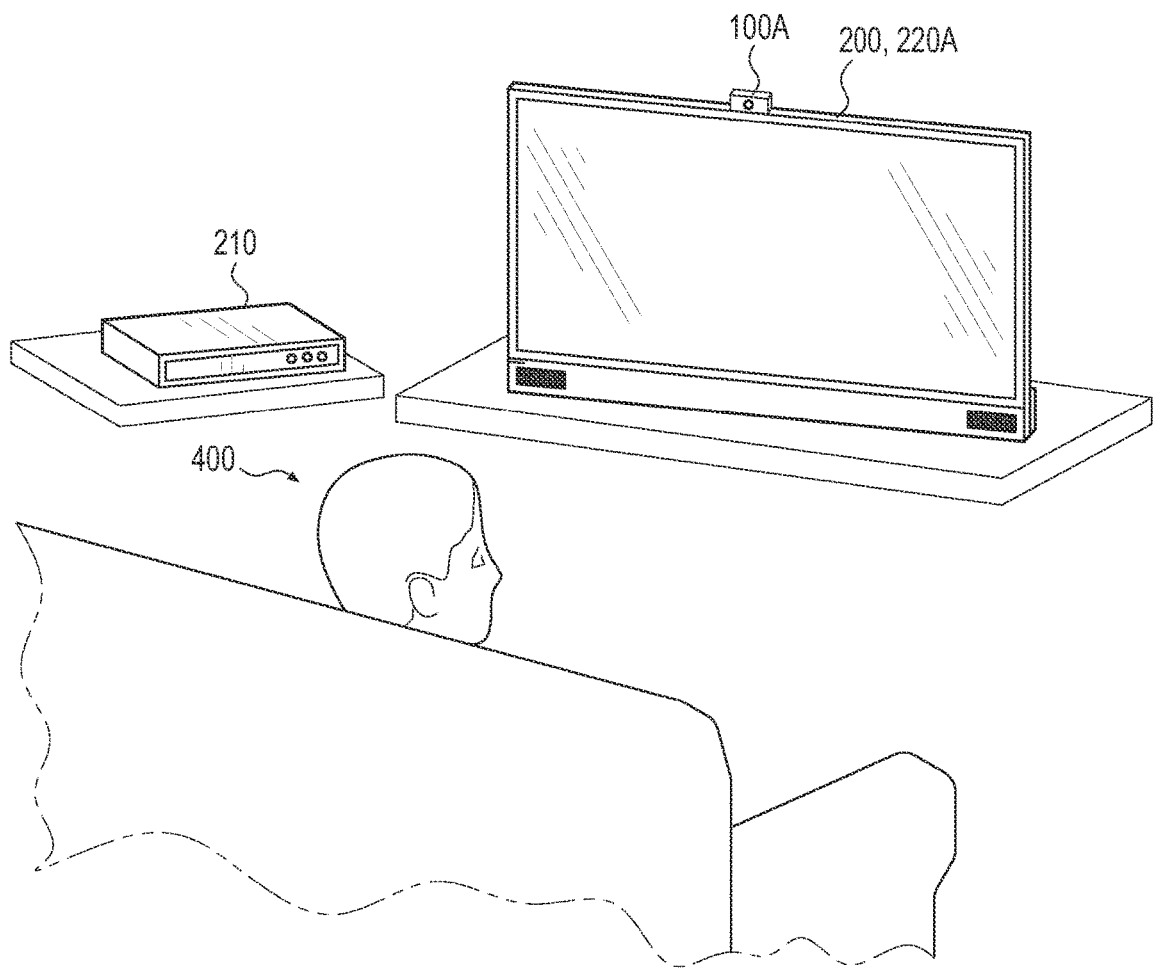
FIGS. 2A, 2B, 2C, 2D and 2E are pictorial diagrams illustrating a system for controlling data consumption according to embodiments.
Figure 2B:
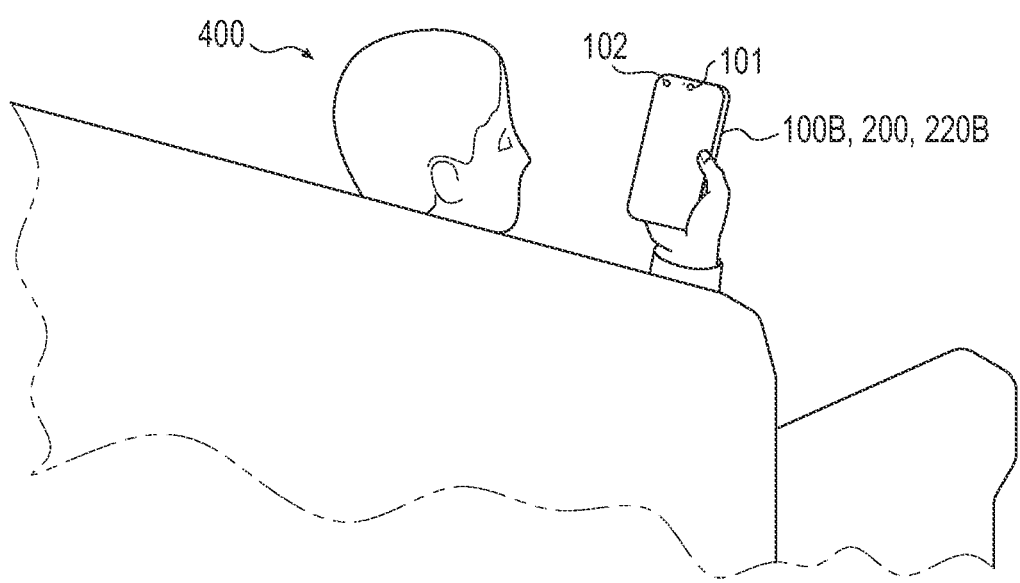

Referring to FIG. 2A, a user 400 is seated in a location. The display device 220 as shown in FIG. 1 may be, for example, a television 220A as represented in FIG. 2A, or another device such as a cell phone 220B as represented in FIG. 2B, a tablet, a computer, or any other device capable of displaying media. The user 400 may be viewing the television 220A as shown in FIG. 2A. The display device 220 may also be a data consuming device 200, for example when the television 220A has integrated smart technology and can directly communicate with the gateway device and connect to the internet. Thus, in this case, the data consuming device 200 may be the television itself, which is capable of connecting to the internet either by directly communicating with a gateway device, or via wired or wireless connections to other internet-connected components.

In other implementations, the data consuming device 200 may be realized as a component external to the display device 220 such as a streaming device, for example a Roku®, Amazon® Fire TV® stick, Chromecast®, or other media device that allows for streaming using an OTT service by connecting to the internet, either via wired or wired connection. This may occur by the data consuming device 200 communicating with the gateway device to connect to the internet. In some embodiments, digital video recorder (DVR) 210 is also provided, in some embodiments where a DVR 210 is included, the DVR 210 may be used to record and/or store content that has been provided by a streaming service or other media providing service. The DVR 210 may be connected wirelessly or via wired connection to the data consuming device 200, and may be individually capable of connecting to the internet by communicating with a gateway device or may be capable of connecting to the internet via the data consuming device 200 or via its own internal hardware. In some implementations, the DVR 210 may be its own data consuming device and may act as the data consuming device 200.

Referring to FIG. 2A, an external camera or LIDAR 100A is provided as an exemplary acquisition device 100. The camera or LIDAR 100A is mounted on the data consuming device 200 (the television 220A or an external component), or may be provided within the internal configuration of the data consuming device 200 (either the television 220A or the external component). The camera or LIDAR 100A may be connected, by wired connection or wirelessly, to the data consuming device 200. The camera or LIDAR 100A may also be individually capable of connecting to the internet via the gateway device.

Referring to FIG. 2B, a cellular phone 100B is provided as an example of an acquisition device 100. The cellular phone 100B has a camera 101 that is capable of taking images and a LIDAR 102 that uses a laser and is capable of acquiring data relating a user's position, orientation, existence at a particular location, or the like.

In some embodiments, the cellular phone 100B, using camera 101, will take an image of a user 400. The cellular phone 100B may take a series of images at a predetermined frequency for a predetermined time period.

As shown in FIG. 2B, the data consuming device 200 and the display device 220 may also be integrated in the same cellular phone 100B, and the cellular phone 100B and the camera 101 or LIDAR 102 therein can act as both a data consuming device 200 and an acquisition device 100. That is, the cellular phone 100B may be capable of displaying media. The cellular phone 100B may also directly communicate with the gateway device and connect to the internet. Additionally or alternatively, a gateway device may not be necessary as the cellular phone 100E or any acquisition device 100 and/or data consuming device 200 represented in the aforementioned and later-mentioned embodiments may connect directly to the internet using, for example, a carrier's cellular network. Thus, in this case, the data consuming device 200 may be the cellular phone 100B itself, which is capable of connecting to the internet either by directly communicating with a gateway device, or via wired or wireless connections to other internet-connected components. In some embodiments, though not shown, a separate data consuming device 200 such as those described in previous embodiments may be used to connect the cellular phone 100B to the internet.

The configurations of FIGS. 2A and 2B may be particularly advantageous given the reduction of parts necessary to perform the methods of the instant application, potential data consumption and communication efficiency, and potential cost-saving to a user.

Figure 2C:
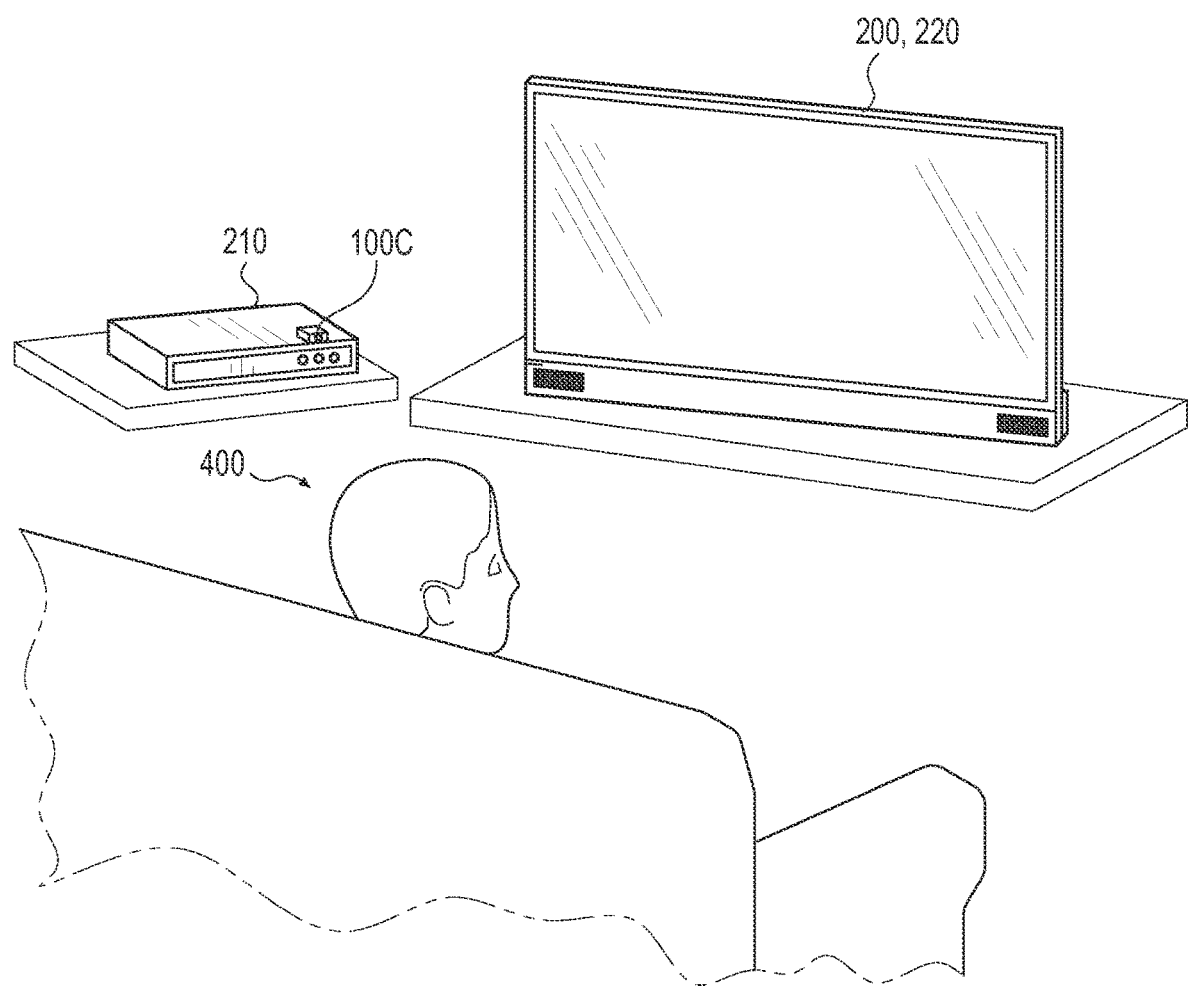

Referring to FIG. 2C, a camera 100C acting as the acquisition device 100 may instead be provided external to or as part of the DVR 210. The configuration and implementations are otherwise similar to that described with respect to FIG. 2A.

Figure 2D:
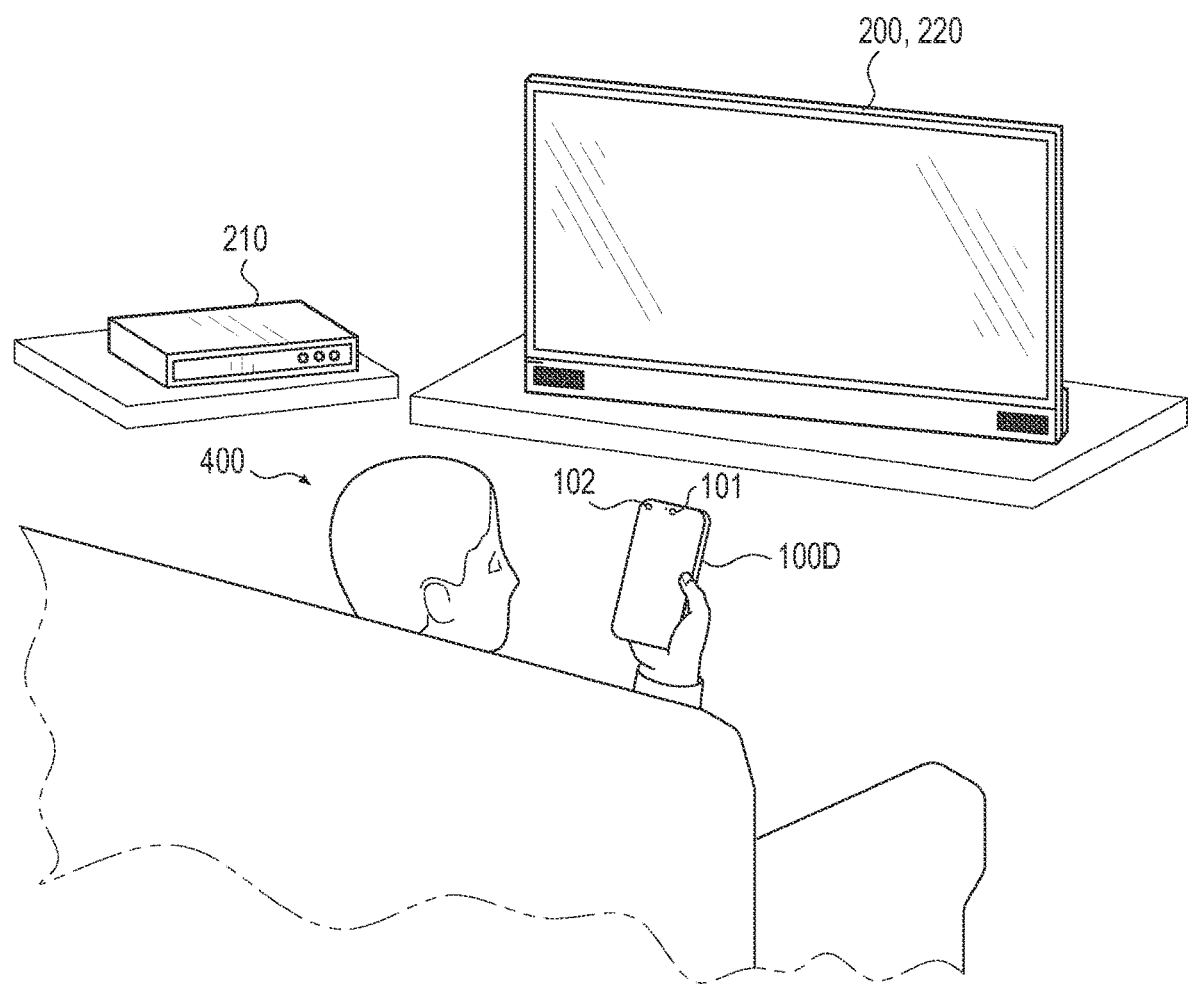

Referring to FIG. 2D, an implementation in which the television is used as the display device 220 and optionally also the data consuming device 200, whereas the cellular phone 100D having a camera 101 and/or a LIDAR 102 is used as the acquisition device 100 is provided. In such a case, the cellular phone 100D and the data consuming device 200 (whether the data consuming device 200 is the television itself or a peripheral component that can connect to the internet) may communicate with each other via wired or wireless technology. The other aspects of the configuration of FIG. 2D are similar to those described with respect to FIG. 2A, and the data consuming device 200 can be within or external to the display device 220.

Figure 2E:
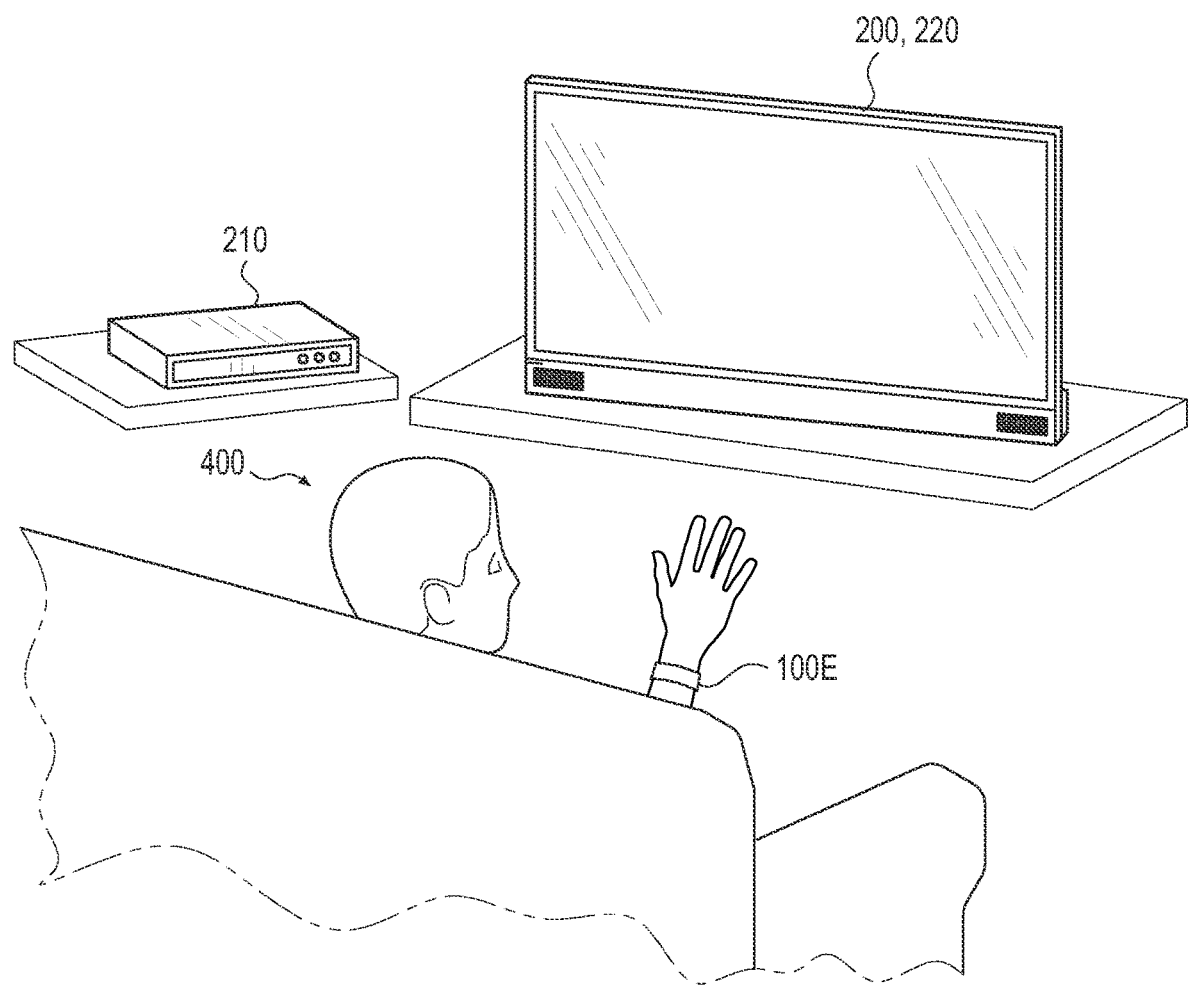

Referring to FIG. 2E, a wearable device 100E is worn on a wrist of the user 400. The wearable device 100E may be any device that is capable of taking data relating to the user 400, for example biometric data. Nonlimiting examples of wearable device 100E may be a smart watch, a fitness tracker, or the like. The wearable device 100E may be individually capable of connecting to the internet via the gateway device, or directly to the internet via, for example, a cellular network.

The other aspects of the configuration of FIG. 2E are similar to those described with respect to FIG. 2A, and the data consuming device 200 can be within or external to the display device 220.

Figure 3A:
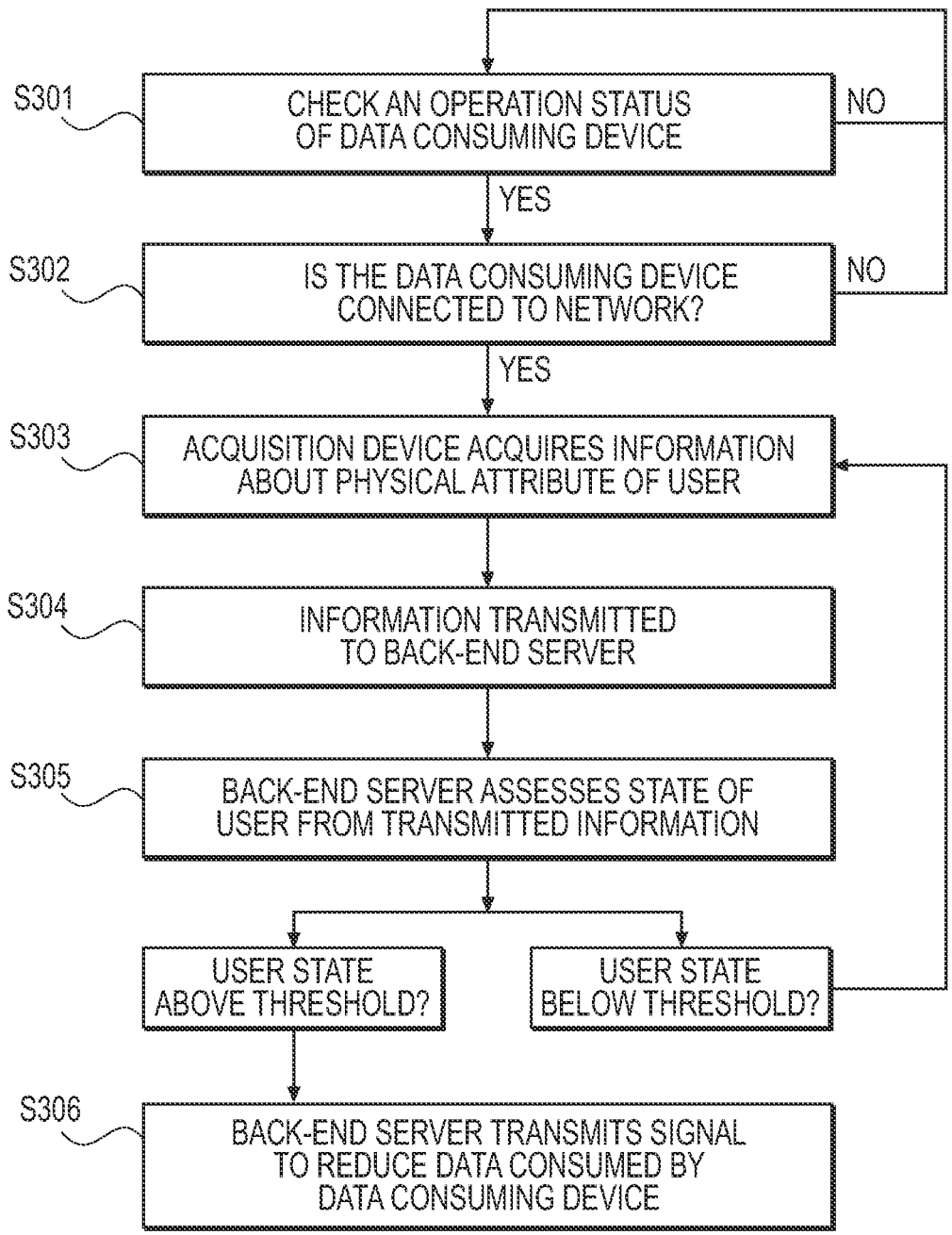
FIGS. 3A, 3B and 3C are flow diagrams illustrating exemplary methods for controlling operation of a data consuming device according to embodiments.

Further, while FIGS. 2A-2D show examples where the data consuming device 200 is a television and the acquisition device 100 is a device external to the data consuming device, this disclosure is not so limited. Referring to FIG. 3A, an exemplary method of some embodiments is described. The embodiments may be carried out by the structure provided in any or all of FIGS. 2A-2E.

In a step S301, the method may check an operation status of the data consuming device 200. This may include, for example, checking if the data consuming device 200 is turned on, but may also include checking if the data consuming device 200 is in some other predetermined state such as an active state, a standby state, a recording state, a streaming state, or the like. Further, the operation status may be whether the data consuming device 200 is connected to a network, and thus step S301 and step S302 defined later may be combined as one step.

Step S301 may be performed by, for example, the processor within the data consuming device 200 itself, or within the processor of the back-end server 250. If the data consuming device 200 is turned on or in the predetermined state, the method continues to step S302. Otherwise, the method will repeat step S301 after a predetermined time lapse, and check again whether the data consuming device 200 is turned on or otherwise in a particular operation status. The predetermined time lapse may be any predetermined amount of time, such as one second or less, 5-10 seconds, 1-2 minutes, or longer.

In step S302, the method will check whether the data consuming device 200 is connected to a network, for example, the internet. This step may be performed by, for example, the processor within the data consuming device 200 itself, or within the processor of the back-end server 250. This may, for example, include a check as to whether a streaming platform is currently active and displaying media on the data consuming device 200. If the data consuming device 200 is determined to be connected to the internet, the method continues to step S303. Otherwise, the method will repeat step S301 and/or step S302 after a predetermined time lapse, and ultimately check again whether the data consuming device 200 is connected to the internet. The predetermined time lapse may be any predetermined amount of time, such as one second or less, 5-10 seconds, 1-2 minutes, or longer.

In step S303, the acquisition device 100 acquires information relating to a user. In systems where the acquisition device 100 is a camera, for example as in FIGS. 2A-2C, images may be taken of an area including an area where the user 400 is located. If the user 400 is not located within a field of view of the acquisition device 100 after at least one attempt, the acquisition device 100 may be configured to move, via rotational motion, linear axial motion or another type of motion, and may take subsequent images until serviceable images of the user 400 are acquired. The number of images that the acquisition device 10 takes is not limited, though in some embodiments the acquisition device 100 will take dozens or hundreds of still images, or a video image of at least one second, at least 10 seconds, or at least one minute, or several video images taken at predetermined intervals of, for example, 15-30 seconds, or 1-2 minutes.

In systems where the acquisition device 100 includes a LIDAR, a laser is used to detect information relating to the user 400, such as the positioning of the user 400, the orientation of the user's eyes and eyelids, and the like. If the user 400 is not located within a field of view of the acquisition device 100 after at least one attempt, the acquisition device 100 may be configured to move, via rotational motion, linear axial motion or another type of motion, and may take subsequent readings until serviceable data of the user 400 are acquired. The number of readings that the acquisition device 100 takes is not limited, though in some embodiments the acquisition device 100 will take dozens or hundreds of data points over at least one second, at least 10 seconds, or at least one minute, or several minutes.

In systems where the acquisition device 100 includes a wearable device, such as wearable device 100E of FIG. 2E, the acquisition device 100 may take numerous readings until serviceable data of the user 400 are acquired. The number of readings that the acquisition device 100 takes is not limited, though in some embodiments the acquisition device 100 will take dozens or hundreds of data points over at least one second, at least 10 seconds, or at least one minute, or several minutes. The readings may be biometric data of the user 400, such as the pulse and/or heart rate of the user 400, a sound of breathing and/or snoring of the user 400, motion of the user's wrist or lack thereof, or the like.

Once the acquisition device 100 acquires the information relating to the user 400, the method includes a step S304 transmitting the acquired information to the back-end server 250. This may be done via the internet, which may be by the acquisition device 100 connecting directly to the internet via the user's gateway device, or by the acquisition device 100 connecting to one of the data consuming device 200 or DVR 210 via wired or wireless connection, and signaling the data consuming device 200 or DVR 210 to transmit the acquired data through its own internet connection with via the user's gateway device.

In embodiments where the back-end server 250 is a local server that is provided within the acquisition device 100, the data consuming device 200 or the DVR 210, the information relating to the user may be provided to the back-end server 250 via an internet connection and/or through a local area network or other network (for example, a wide area network), Bluetooth or other near field communication.

In step S305, the back-end server 250 will assess the state of the user using the transmitted information. The assessment may involve determining whether the user is no longer awake, and is instead sleeping. In some embodiments, the back-end server 250 and the processor therein will compare multiple data points from the images, LIDAR data or biometric data of the user that is acquired by the acquisition device 100. The back-end server 250 may compare the data points to each other, so as to determine whether a user 400 has fallen asleep or is otherwise unable to view the data being streamed and/or displayed by the data consuming device 200. In some embodiments, the data points are additionally or alternatively compared to data stored within the back-end server 250, the stored data representing a likely representation of when the user 400 is sleeping or unavailable or the like. For example, the back-end server 250 may have stored data of the user 400 being determined to be sleeping at a previous time, and may compare the instant acquired data to the previously stored data to determine whether the user 400 is currently in a sleeping state or other predisposed state. Even in situations where the back-end server 250 does not have previously stored data relating to the user 400, the back-end server 250 and processor thereof may be capable of comparing the acquired data to stock data representing when a typical user may appear to be in a sleeping state or other predetermined state, and make an assessment as to whether the user 400 is in a sleeping state or a predetermined state.

In some embodiments, the back-end server 250 is capable of learning from the acquired data and the subsequent assessment, and may store the acquired data and subsequent assessment, and optionally a user confirmation that the assessment was accurate or inaccurate, to allow for better assessment of the state of the user in the future.

As a result of step S305, the back-end server 250 determines the state of the user 400 from the transmitted information, if the user's state is determined to be above a threshold, the back-end server 250 will transmit a signal to reduce the data being consumed by the data consuming device 200.

As an example, the back-end server 250 will determine, based upon the transmitted information, whether the user is in a sleeping state. In a case where the acquisition device 100 is a camera, the back-end server 250 will seek images where the user's posture is a sleeping posture (e.g., based upon a lateral position of the body, an angle of the neck, or other recognizable position), or where the user's eyes are closed. The back-end server 250 may also look for images where the user's eyes are not directed at the television (e.g., the user's eyes are directed at the side of a sofa or chair, or a pillow, or the like). In other implementations, a position of the user's eyes or eyelids may be assessed and compared to stored images either of the same user taken by the acquisition device 100 at an earlier time point, or of the same user or of other users that are stored in the back-end server. The back-end server 250 will perform an analysis using the acquired images to determine if a threshold number of images have characteristics to indicate that the user is in a sleeping state. This may be at least one image over a period of a few seconds, or 15-30 seconds, or 1-2 minutes, or at least two images over the same periods, or 5-10 images, or more. This may also be at least one video image showing the user 40) in a position considered to be in a sleeping state for at least a predetermined amount of time, such as 2-5 seconds, or 15-30 seconds, or 1-2 minutes. Ultimately, the back-end server 250 will compare the resultant acquired data from the acquisition device to a threshold, and determine if the user 400 is considered to be in a sleeping state.

Ina case where the acquisition device 100 is a LIDAR, the acquisition device 100 may emit pulsed light waves to determine an energy level at particular locations on or near the user 400. The back-end server 250 will compare the resultant acquired data from the acquisition device to a threshold, and determine if the user 400 is considered to be in a sleeping state.

In a case where the acquisition device 100 is a fitness bracelet or smartwatch worn on the user, the acquisition device 100 may acquire biometric data from the user 400, for example, pulse rate and/or heart rate and/or breathing rate and/or audio relating to breathing and/or snoring. The back-end server 250 will compare the resultant acquired data from the acquisition device to a threshold over a predetermined period of time, and accordingly determine if the user 400 is considered to be in a sleeping state.

In any case, the threshold basis for comparison to make the determination of the user's state may be based upon stored data in the memory of the back-end server 250. The stored data may include data of other users or other commonly understood images or data to suggest when one is sleeping. The stored data may also include data of the particular user 400 from previous experiences, and the back-end server 250 may incorporate each time or sometimes the user 400 is assessed to be asleep or not asleep to iteratively learn the user's 400 specific behavior and accordingly to modify the threshold for the decision as to whether the back-end server 250 determines the user 400 is sleeping in a future situation. That is, the back-end server 250 may perform machine-learning to improve the reliability of future threshold comparisons.

In some situations, at some time after the back-end server 250 takes an action to determine that the user is sleeping, the user 400 will be asked whether the determination was accurate. Based upon the user's response, the back-end server 250 may adjust a future threshold value accordingly.

While the above example is for a determination that the user 400 is sleeping, the instant disclosure is not so limited. The back-end server 250 may instead, for example, use the data acquired by the acquisition device 100 to determine another state of the user, which may include any reason why a user 400 may no longer be actively watching media from the data consuming device 200. For example, the back-end server 250 may determine that the user 400 is in a state where he or she has left the area where the data consuming device 200 is housed. In some embodiments, the back-end server 250 may determine that the user 400 has stepped away from the room having the data consuming device 20) for at least a predetermined time. The threshold to determine whether the user 400 is in a state where he has left the room in this case may be several minutes or more, so as to avoid a decision that the user's state is above the threshold in a case where he has only stepped out of the room temporarily (e.g., to get a drink from the fridge, or use the restroom, or the like). The back-end server 250 will use any of the camera images, LIDAR data or wearable data (which in this case may use positional information such as GPS) to determine whether the user 400 has left the room for a threshold amount of time.

If it is determined that the user 400 has a state above the threshold (for example, he is determined to be sleeping for a threshold amount of time or has left the room for a threshold amount of time, or any other predetermined state), the method proceeds to step S306, which involves the back-end server 250 transmitting a signal to reduce the data consumed by the data consuming device 200. This may be a direct signal from the back-end server 250 to the data consuming device 200, and/or an internet signal, or, in a case where the back-end server 250 is housed within a component in the user's house, it may be a direct wired or wireless signal using internet, Bluetooth, other near field communication, or the like.

If it is determined that the user 400 has a state that is not above the threshold, the data consuming device 200 will continue to operate normally and the method proceeds back to step S313, where the acquisition device 100 acquires information, which may be second information, relating to the user again based upon a predetermined acquisition schedule. For example, the new acquisition may occur 1 second, or 30 seconds, or 1 minute, or 5 minutes after the assessment that the user state was below the threshold. The second information may be a same type of information as the initially acquired information, just at a different time point. The second information may also be an entirely different type of information. As an example, in situations where the acquired information and the second information are different, the acquired information may be information of the user's heart rate, and the second information may be information of the user's breathing rate, or vice versa.

The signal to reduce the data consumed by the data consuming device 200 may result in the data consuming device taking some action to reduce its consumed data. This may include pausing a show that is currently streaming and being shown on the display device 220, disconnecting itself from the internet, or even powering off the data consuming device 200 and/or the display device 220 when the two devices are separate devices. The signal may also include a signal to instruct the DVR 210 or another internal system having a memory to record the show that is currently streaming, so that the user 400 may easily view it at a later time without consuming much additional data.

Accordingly, when it is determined that the user 400 is in a state where he or she is no longer viewing content that is requiring data consumption, the consumption can be advantageously minimized or otherwise used so that the user 400 does not need to pay for wasted data, does not reach a data cap as easily, and so that data provider is not needlessly providing data and wasting data and/or bandwidth.

Figure 3B:
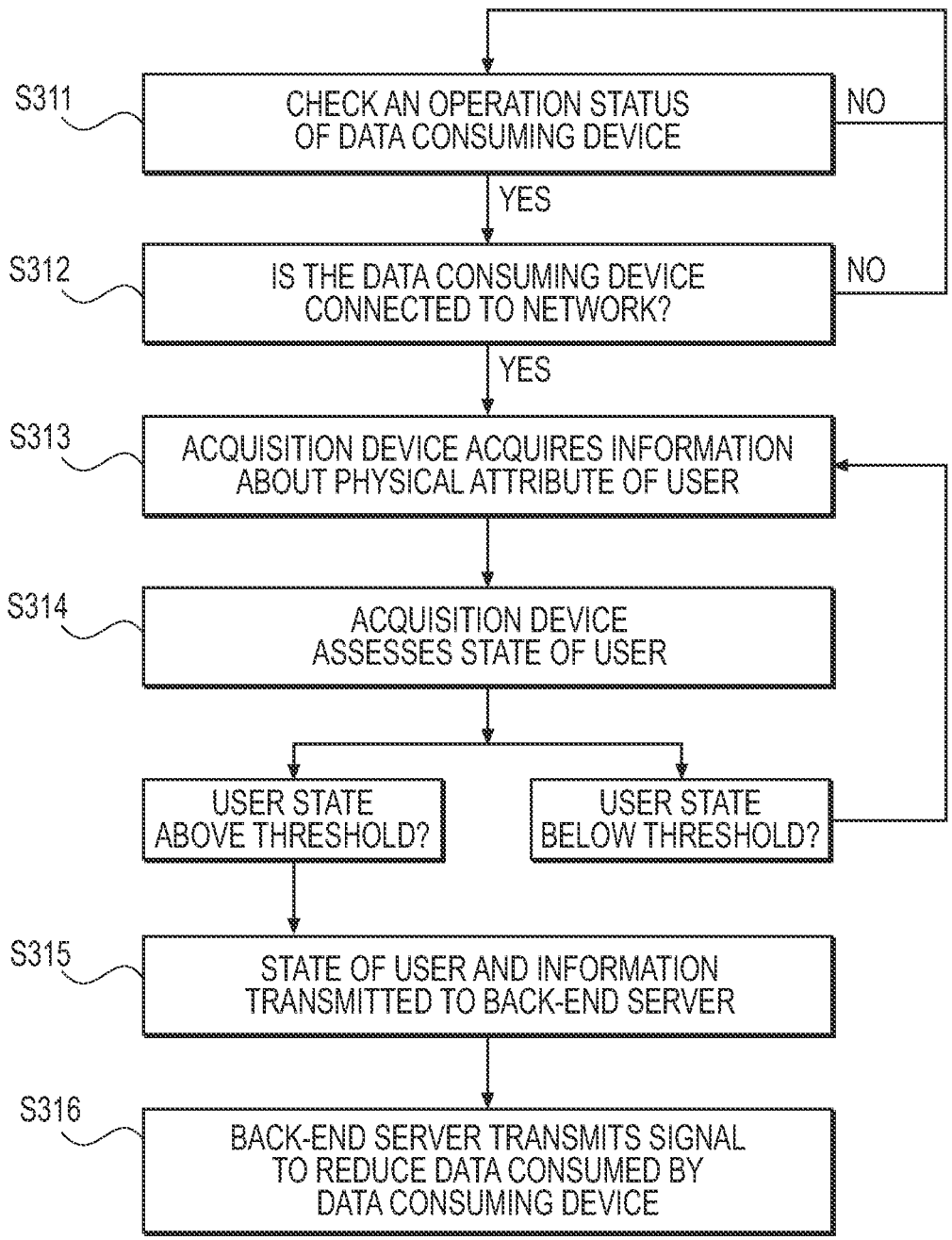

FIG. 3B shows another embodiment of a method according to the instant application. Steps S311, S312 and S313 correspond to steps S301, S302 and S303 of FIG. 3A, respectively. However, in step S314, the acquisition device 100 performs the assessment of the state of the user. This step may be substantially similar to S305 in FIG. 3A, except that the acquisition device 100 uses its own acquired data and performs the assessment internally, without using the back-end server. In this case, the acquisition device 100 may compare the acquired data to data of the particular user 400 from previous experiences, and the acquisition device 100 may incorporate each time or sometimes the user 400 is assessed to be asleep or not asleep to iteratively learn the user's 400 specific behavior and accordingly to modify the threshold for the decision as to whether the acquisition device 100 determines the user 400 is sleeping in a future situation. In this case, the acquisition device 100 is able to utilize machine learning to better aid in determining a proper threshold, similar to the situation described in FIG. 3A with respect to the back-end server 250.

In step S314, the acquisition device 100 may use information from the back-end server 250, such as stored information about data of other users or other commonly understood images or data to suggest when one is sleeping, has left the room, or the like, to aid in the assessment. In some cases, the acquisition device 100 and back-end server 250 work together to make the assessment as to whether the user is in a particular state.

In step S315, similarly to S304, the back-end server 250 receives the acquired information (for storage and/or learning purposes, for example). However, in step S315, the back-end server will also receive the assessed state of the user from the assessment device. In step S316, similarly to S306, the back-end server 250 transmits a signal to reduce the data consumed by the data consuming device 200.

Figure 3C:
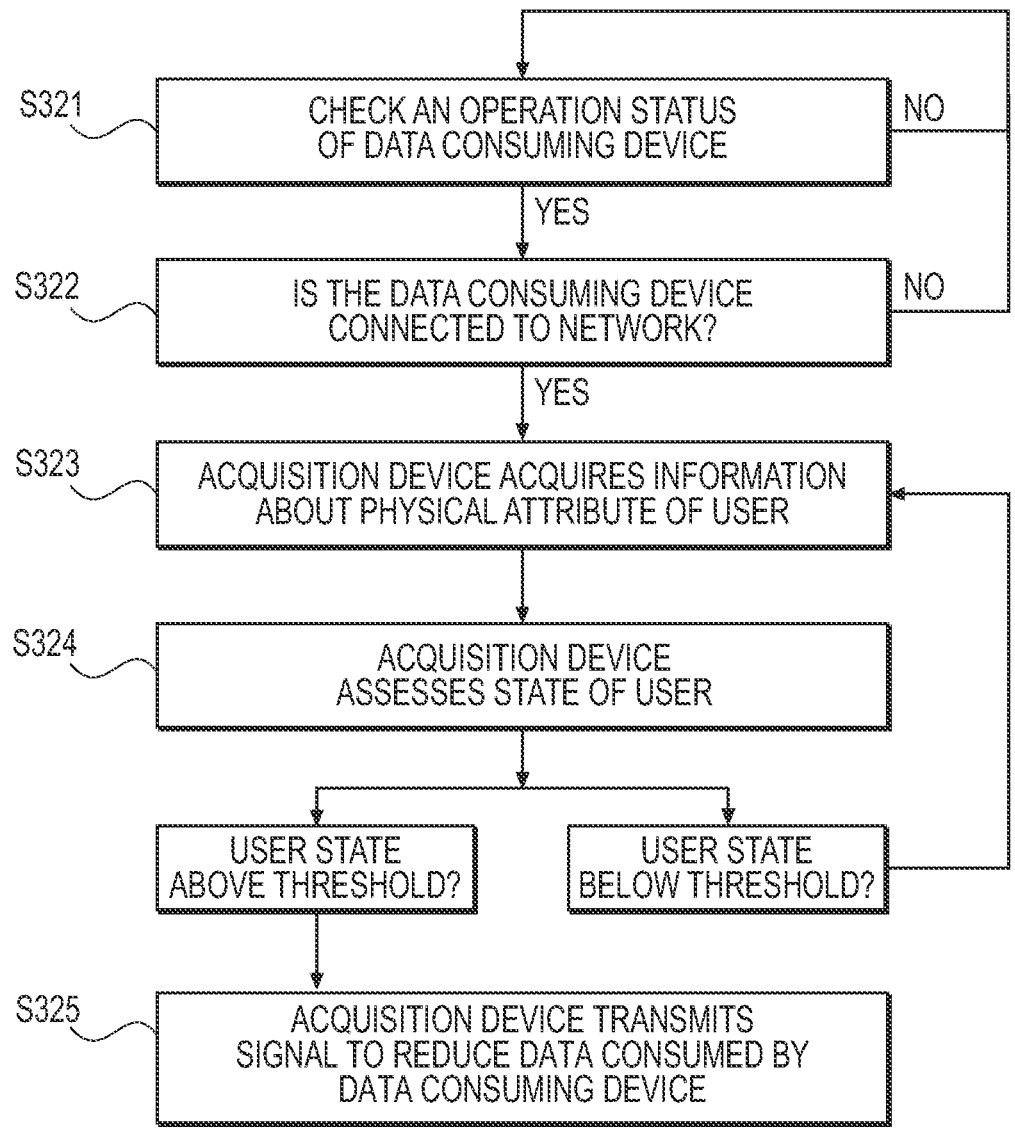

FIG. 3C shows another embodiment of a method according to the instant application. Steps S321, S322, S323 and S324 correspond to steps S321, S322, S313 and S314 of FIG. 3B, respectively. Then, in step S325, the acquisition device 100 transmits the signal to reduce the data consumed by the data consuming device 200. This may occur via an internet connection and/or through a local area network or other network (for example, a wide area network), Bluetooth or other near field communication. Optionally, the acquisition device may provide the results of the assessment and/or the acquired information to the back-end server 250 for storage and learning purposes.

Other implementations of the described features are within the scope of the disclosure. For example, while the above-described embodiments relate to internet and internet data usage, other embodiments may also address data or power usage of any type of network, including but not limited to the internet. As one example, the system and methods of the instant invention may generally detect a whether the user is in a particular state, and if so, reduce or eliminate power usage of a particular component, such as turning off a light or other power consuming device once it is assessed by a server or an acquisition device that the user is in the predetermined state. This may be done using a local network and may or may not involve the internet.

Although specific embodiments were described herein, the scope of the invention is not limited to those specific embodiments. The scope of the invention is defined by the following claims and any equivalents therein.

As will be appreciated by one skilled in the art, aspects of the present disclosure may be embodied as a system, a method or a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a non-transitory computer readable storage medium may be any tangible medium that can contain, or store a program for use by or in connection with an instruction execution system, apparatus, or device.

Aspects of the present disclosure are described above with reference to flowchart illustrations and block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

What is claimed is:

1. A method for controlling data consumed by a data consuming device, the method comprising:
checking whether the data consuming device is consuming data via a connection to a network; and in response to determining that the data consuming device is consuming the data via the connection to the network:
  acquiring first information about at least one physical attribute of a user;
  assessing whether the user is in a predetermined physical state using the first information about the at least one physical attribute; and
  transmitting a signal to reduce the data consumed by the data consuming device in response to assessing that the user is in the predetermined physical state,
wherein when the user is assessed not to be in the predetermined physical state based on the first information, the method further comprises:
  acquiring second information relating to the user;
  assessing whether the user is in the predetermined physical state using the second information relating to the user; and
  transmitting a signal to reduce the data consumed by the data consuming device in response to assessing that the user is in the predetermined physical state,
  wherein the second information is a different type of information from the first information, and
wherein assessing whether the user is in the predetermined physical state includes confirming that the user is in the predetermined physical state for at least a predetermined amount of time before transmitting the signal to reduce data consumed by the data consuming device.

2. The method according to claim 1, further comprising transmitting the first information to a back-end server, wherein the back-end server performs the step of assessing whether the user is in the predetermined physical state.

3. The method according to claim 1, wherein the first information is acquired by a camera.

4. The method according to claim 1, wherein the predetermined physical state is a sleeping state.

5. The method according to claim 1, wherein the data consumed by the data consuming device includes streaming of media and the signal to reduce data includes a signal to pause the streaming of media.

6. The method according to claim 1, further comprising transmitting a signal to record a program that is currently streaming.

7. The method according to claim 1, further comprising transmitting that the user is in the predetermined physical state to a device capable of acquiring the information relating to the user.

8. A system for controlling data consumption, comprising:
a back-end server connected to a network, the back-end server providing data to a data consuming device via the network;
wherein the back-end server comprises a processor configured to:
  receive, via the network, first information about at least one physical attribute of a user that is acquired by an acquisition device;
  assess the first information about the at least one physical attribute of the user to determine whether the user is in a predetermined physical state; and
  in response to determining that the user is in the predetermined physical state, transmit a signal, via the network, to reduce data consumed by the data consuming device,
wherein when the user is determined not to be in the predetermined physical state based on the first information, the processor of the back-end server is further configured to:
  receive second information relating to the user, wherein the second information is a different type of information from the first information;
  assess the second information to determine whether the user is in the predetermined physical state using the second information; and
  in response to determining that the user is in the predetermined physical state, transmit a signal, via the network, to reduce data consumed by the data consuming device,
wherein determining that the user is in the predetermined physical state includes confirming that the user is in the predetermined physical state for at least a predetermined amount of time before transmitting the signal to reduce data consumed by the data consuming device.

9. A system for controlling data consumption, comprising:
a data consuming device comprising a first processor; and
an acquisition device that comprises a second processor configured to:
  acquire first information about at least one physical attribute of a user; and
  transmit the first information to the data consuming device;
wherein the first processor of the data consuming device is configured to:
  assess the first information and, based on the first information, determine whether the user is in a predetermined physical state; and
  in response to determining that the user is in the predetermined physical state, reduce data consumption by the data consuming device; and
  when the user is determined not to be in the predetermined physical state based on the first information:
    acquire second information relating to the user;
    assess the second information and, based on the second information, determine whether the user is in the predetermined physical state,
  wherein the second information is a different type of information from the first information, and
  wherein determining whether the user is in the predetermined physical state includes confirming that the user is in the predetermined physical state for at least a predetermined amount of time before transmitting the signal to reduce data consumed by the data consuming device.

10. The system according to claim 9, wherein the acquisition device is a camera.

11. The system according to claim 10, wherein the camera is provided within a cellular telephone.

12. The system according to claim 10, wherein the camera is mounted on or provided within the data consuming device.

13. The system according to claim 9, wherein the acquisition device is a LIDAR.

14. The system according to claim 9, wherein the acquisition device is a wearable device.

15. The system according to claim 9, wherein the data consuming device is a television.

16. The system according to claim 9, further comprising a digital video recorder.

17. The system according to claim 16, wherein the digital video recorder is configured to record a program when the user is in the predetermined physical state.

18. The system according to claim 9, wherein the acquisition device further comprises a memory, and the acquisition device stores the assessment of the predetermined physical state in the memory.

19. The system according to claim 8, wherein the data consumed by the data consuming device includes streaming of media and the signal to reduce data includes a signal to pause the streaming of media.

20. The system according to claim 8, wherein in response to determining that the user is in the predetermined physical state, the processor is further configured to transmit a signal to record a program that is currently streaming.

\* \* \* \* \*